Aug. 9, 1955   L. W. LANCASTER   2,715,042
SAFETY GUARD FOR WINDSHIELDS
Filed July 25, 1952
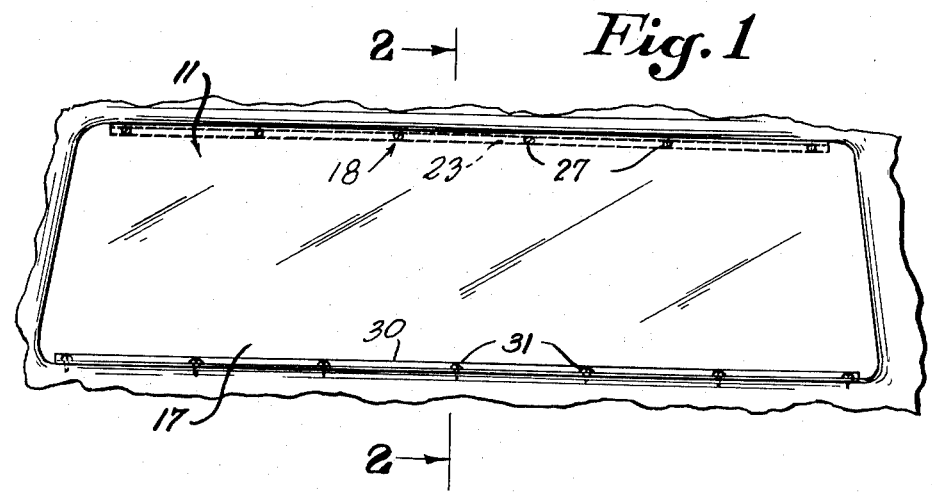
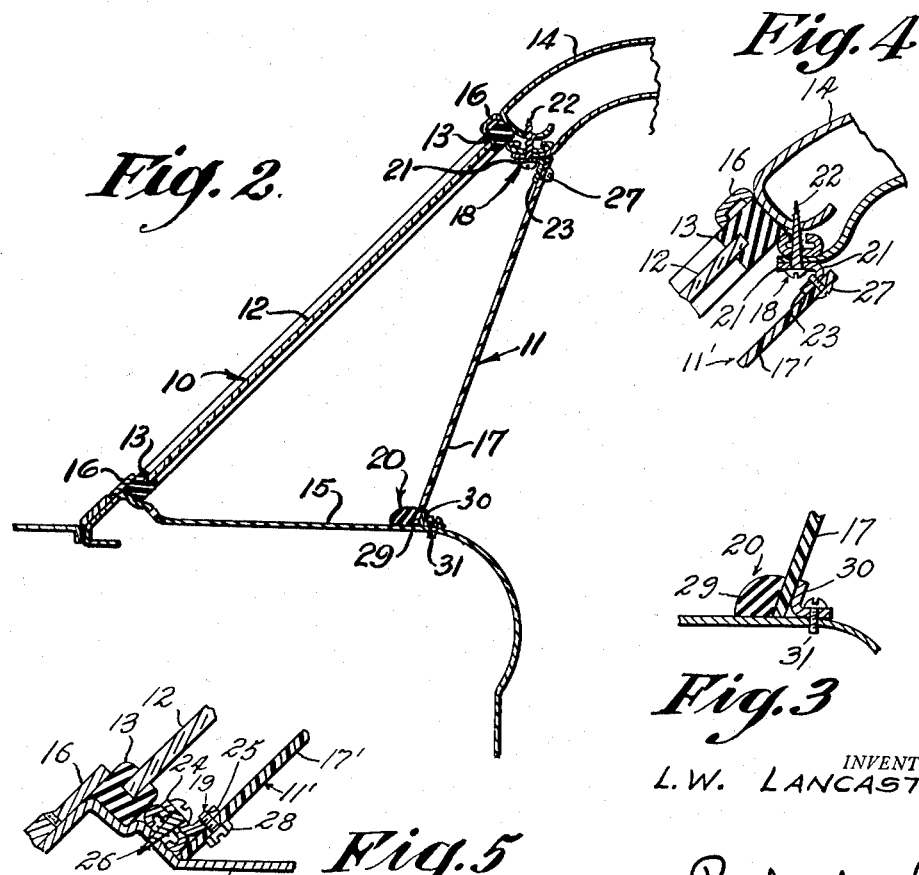
INVENTOR.
L. W. LANCASTER
BY *Richard J. Geier*
ATTORNEYS

United States Patent Office 2,715,042
Patented Aug. 9, 1955

2,715,042

SAFETY GUARD FOR WINDSHIELDS

Lionel W. Lancaster, Red Bank, N. J.

Application July 25, 1952, Serial No. 300,957

2 Claims. (Cl. 296—84)

This invention relates to improvements in automotive vehicle construction, and more particularly to improvements in the windshield construction of automotive vehicles.

The object of the invention is to protect persons riding in automobiles from bodily injury, which could be caused by collision of the person with the glass windshield of the automobile.

It is also an object of the instant invention to disclose a windshield designed to reduce the hazard of flying glass when broken.

Another object is to increase the safety of the highways.

A further object is to disclose a safety windshield that can be readily installed in any automotive vehicle.

Other objects of the instant invention will become apparent in the course of the following specification.

In the attainment of the aforesaid objectives, subject safety windshield is made in two forms. In both forms, it is constituted of a transparent flexible plastic sheet held at the top in spaced relationship with the inner surface of the usual glass windshield by a bendable strip. In the first form, the plastic sheet is held at the bottom between a rubber strip and another bendable strip to form an acute angle with the glass windshield at the top. In the second form, the plastic sheet is held at the bottom by a bendable strip but without the rubber strip and in spaced parallel relationship with the glass windshield rather than at an acute angle thereto.

The invention will appear more clearly from the following detailed description when taken in conjunction with the accompanying drawings showing by way of example the preferred embodiments of the inventive concept.

In the drawings:

Figure 1 is an elevational view of the safety windshield as viewed from the inside of the motor vehicle showing the first form of the windshield; Figure 2 is a sectional view along the line 2—2 of Figure 1 but on an enlarged scale; and Figure 3 is a fragmentary sectional view of the safety windshield shown in Figure 2 at the bottom and further enlarged. Figures 4 and 5 show the second form of the safety windshield in which Figure 4 is an enlarged fragmentary sectional view of the safety windshield similar to that shown in Figure 1 at the top; and Figure 5 is an enlarged fragmentary sectional view of the windshield of Figure 4 at the bottom.

Referring now in greater detail to the first form of the safety windshield shown in Figures 1-3 where like reference numerals indicate like parts, reference numeral 10 indicates a known glass windshield, and 11 the safety windshield.

The glass windshield 10 has the usual glass panel 12 held by the rubber molding 13 around the peripheral edge thereof. The molding 13 in turn is held intermediate the roof 14 of the motor vehicle and the cowl 15 by the metal trim 16.

The safety windshield 11 is constituted of a transparent sheet of flexible plastic material 17 in spaced relationship with the inner surface of the glass windshield 10. The transparent sheet of plastic material 17 is held at the top by the upper support 18 and at the bottom by the lower support 20.

The transparent sheet of flexible plastic material 17 is of known type and is of sufficient thickness to prevent the occupants of the car from being thrown into the glass windshield, with consequent probable serious injury to said occupants. For example, tests have shown that plastic material known in the trade as "Lucite" and "Plexiglas" having a thickness of around 3/16" is sufficient to withstand the impact of a 200 lb. person moving through approximately 20" at a speed of 70 miles per hour after the windshield has stopped its forward movement. It will also prevent the segments of the glass panel 12 when broken from being thrown into the car to the injury of the occupants. The transparent sheet of flexible plastic material 17 may also be of the type especially designed to give good visibility while cutting down the glare from the head lights of oncoming vehicles or from the sun or the like.

The upper support 18 is an angular member of metal or other suitably bendable material the top portion 21 of which is secured to the steel car roof 14 by any suitable screws 22 with the bottom portion 23 inwardly and downwardly directed. The upper support 18 may be a continuous strip as illustrated or may be spaced clips. Merely by bending the bottom portion 23 of the upper support 18, the transparent sheet of flexible plastic material 11 can be made to assume any desired position in relation to the inner surface of the glass panel 12.

The lower support 20 for holding the sheet 17 at an acute angle to the plane of the glass windshield 10 is constituted of a rubber strip 29 secured to the cowl of the vehicle in spaced parallel arrangement with the bottom of the glass windshield 10 by any suitable means, such as cement, and between the ends of the cowl. The lower support 20 is further constituted of a strip of bendable molding 30 of angular form, the bottom portion of which is fastened to the cowl 15 by the known screws 31 while the upright portion acts as one side of a clamp for wedging the bottom edge of the transparent sheet 17 against the rubber strip 29 as illustrated. Of course, in the acute angular position shown in Figure 2, it will be necessary to bend the lower portion 23 of the upper support 18 inwardly until it is substantially in the plane of the inner edge of the rubber strip 29.

Referring now to the second form of the safety windshield shown in Figures 4 and 5, the glass windshield is the same as in the previously described first form having a glass panel 12 held by the rubber strip 13 intermediate the roof 14 and the cowl 15 by the metal trim 16.

As in the first form, the safety windshield 11' is a transparent sheet of flexible plastic material 17' but held in spaced parallel arrangement with the inner surface of the glass panel 12 rather than at an acute angle thereto by substantially the same upper support 18 previously described.

The lower support 19 (Fig. 5) for holding the plastic sheet 17' in spaced parallel arrangement with the glass panel 12 is constituted also of a bendable angular member of metal or the like having a bottom portion 24 and an integrally formed inwardly and upwardly directed portion 25. The bottom portion 24 is held between the rubber strip 13 and the cowl 15 by any known screws 26. The lower support 19, like the upper support 18, may be a continuous strip as illustrated or spaced clips.

The transparent sheet of flexible plastic material 17' is cut to fit between the downwardly directed portion 23 of the upper support 18 and the upwardly directed portion 25 of the lower support 19 and, of course, between the ends of the glass windshield. The upper edge of the transparent sheet of flexible plastic material 17' is then fastened to the downwardly directed portion 23 of the upper support 18 by any suitable screws 27 while the lower edge of the sheet 17' is fastened to the upwardly directed portion 25 of the lower support 19 by the screws 28.

The operation will be apparent from the foregoing detailed description. Obviously, the flexible transparent sheets 17 and 17' can be designed for installation in any position intermediate the positions shown in the two forms. As in the case of the rubber strip 29, cement may be used to further secure the plastic sheets 17 and 17' in place and the screws 27, 28, and 31 may be placed sufficiently close together to provide substantially continuous support for the sheets. The windshield will also increase the efficiency of the de-frosting system, since all of the heated air will be diverted against the glass windshield. Ventilating ports or slots may be incorporated near the upper edge of the inner shield, to provide outlets for the heated air. Danger from accumulation of ice on the glass windshield is thus rendered unlikely.

While there is above disclosed but two embodiments of the safety windshield, it is possible to produce still other embodiments without departing from the inventive concept herein disclosed, and it is desired, therefore, that only such limitations be imposed on the appended claims as are stated therein.

What is claimed is:

1. A safety windshield for automotive vehicles having a roof, a cowl, and a glass windshield, the safety windshield comprising a flexible transparent plastic sheet, and means for securing said sheet in spaced relationship with the inner surface of the glass windshield, said means comprising a bendable strip disposed on the roof adjacent the inner surface of the glass windshield, means for rigidly securing said plastic sheet to said strip, a second bendable strip disposed on the cowl, and means for rigidly securing said plastic sheet to said second mentioned bendable strip, said bendable strips substantially contacting said sheet for the length thereof.

2. A safety windshield for automotive vehicles having a roof, a cowl, and a glass windshield, the safety windshield comprising a flexible transparent plastic sheet, and means for securing said sheet in spaced relationship with the inner surface of the glass windshield, said means comprising a bendable strip disposed on the roof adjacent the inner surface of the glass windshield, and means for rigidly securing said sheet to said strip; said first mentioned means further comprising a resilient strip disposed on the cowl in spaced relationship with the inner surface of the glass windshield, a second bendable strip disposed on the cowl in juxtaposition with the inner edge of said resilient strip, and means for rigidly securing said plastic sheet intermediate said resilient and second mentioned strips, said strips substantially contacting said sheet for the length thereof.

References Cited in the file of this patent

UNITED STATES PATENTS

| | | |
|---|---|---|
| 1,830,789 | Foster | Nov. 10, 1931 |
| 1,927,033 | Herron | Sept. 19, 1933 |
| 2,102,454 | Bennett | Dec. 14, 1937 |
| 2,186,990 | Pieri | Jan. 16, 1940 |
| 2,345,336 | Fox | Mar. 28, 1944 |